(No Model.) 2 Sheets—Sheet 1.

E. T. GILLILAND.
TELEPHONE APPARATUS.

No. 293,162. Patented Feb. 5, 1884.

WITNESSES.
Chas. N. Leonard.
E. W. Bradford.

INVENTOR.
Ezra T. Gilliland,
PER
C. Bradford,
ATTORNEY.

(No Model.) 2 Sheets—Sheet 2.
E. T. GILLILAND.
TELEPHONE APPARATUS.
No. 293,162. Patented Feb. 5, 1884.
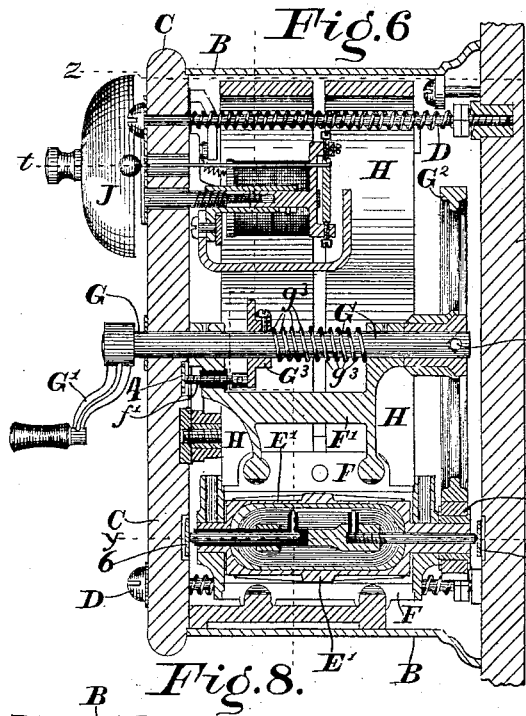
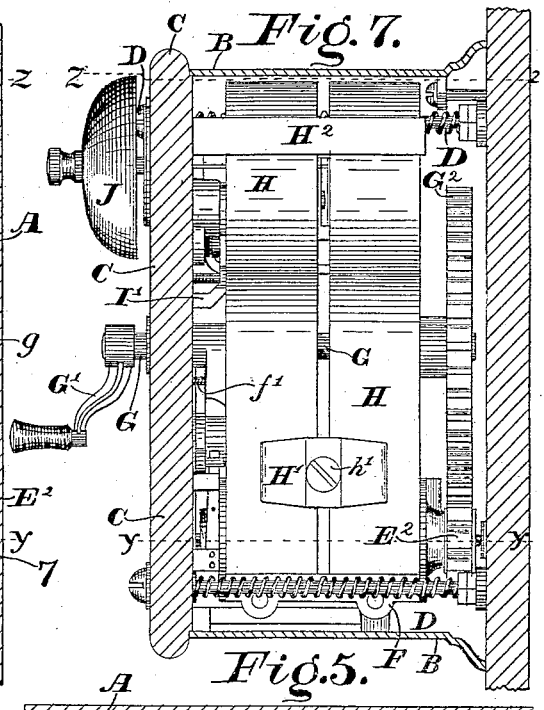
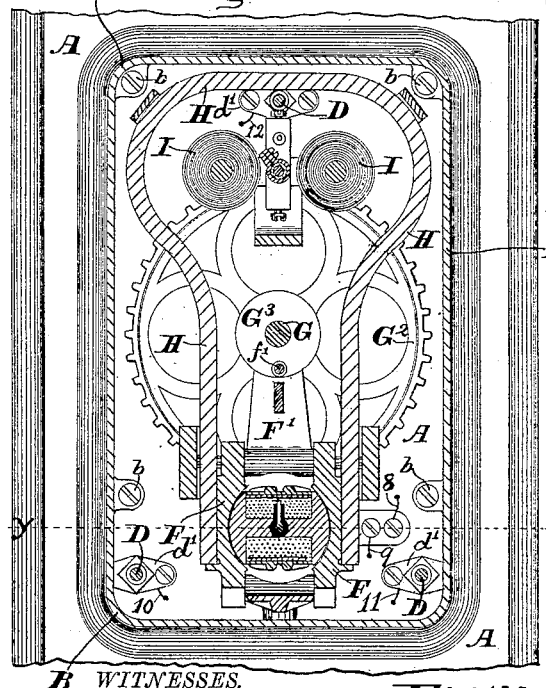
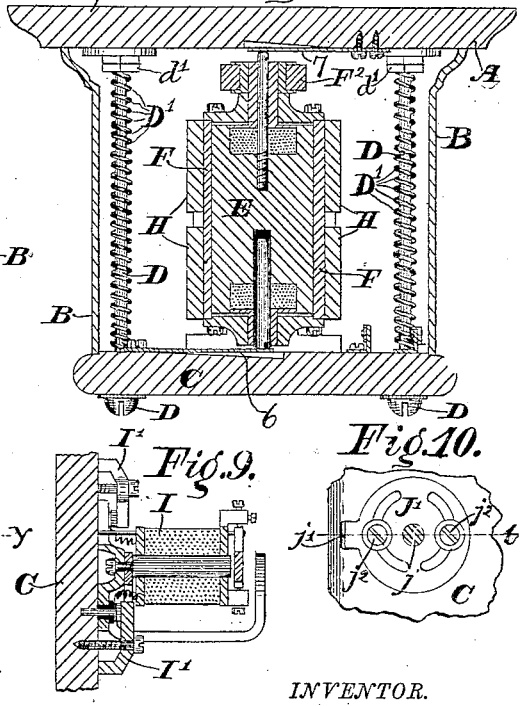
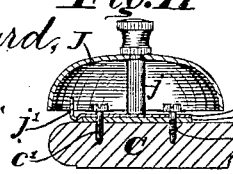
WITNESSES.
Chas. N. Leonard,
E. W. Bradford.
INVENTOR.
Ezra T. Gilliland,
PER
C. Bradford,
ATTORNEY.

UNITED STATES PATENT OFFICE.

EZRA T. GILLILAND, OF INDIANAPOLIS, INDIANA, ASSIGNOR TO THE WESTERN ELECTRIC COMPANY, OF CHICAGO, ILLINOIS.

TELEPHONE APPARATUS.

SPECIFICATION forming part of Letters Patent No. 293,162, dated February 5, 1884.

Application filed February 2, 1883. (No model.)

*To all whom it may concern:*

Be it known that I, EZRA T. GILLILAND, of the city of Indianapolis, county of Marion, and State of Indiana, have invented certain new and useful Improvements in Telephone Apparatus, of which the following is a specification.

My said invention relates to that variety of call-signal apparatus for telephonic purposes which embodies a magneto-electric generator. It consists in many new forms and constructions of details and arrangements of parts, the object being to produce a better and more effective and convenient apparatus, rather than to depart radically from known methods and principles.

Figure 1:
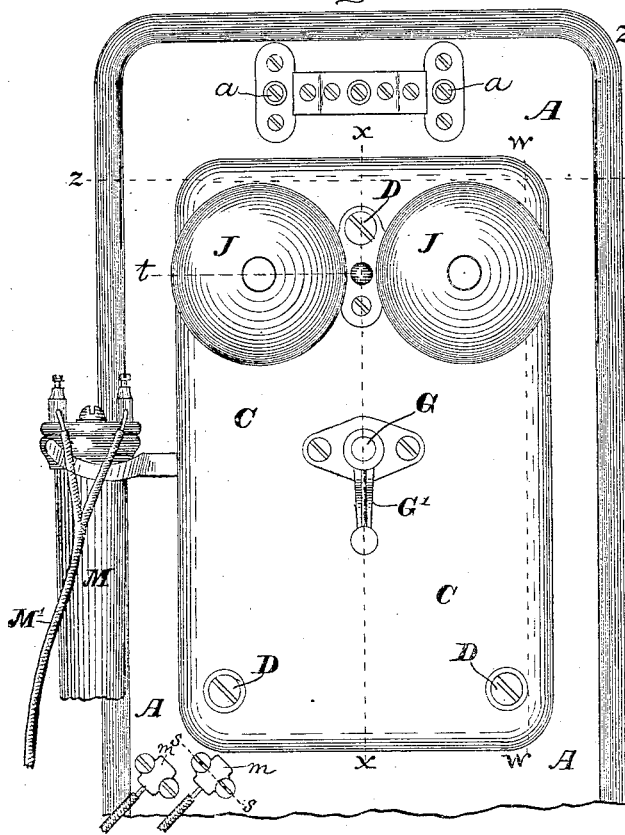
Figure 2:
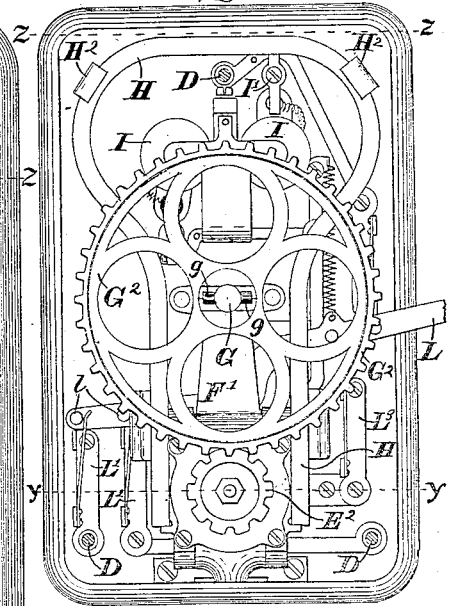
Figure 3:
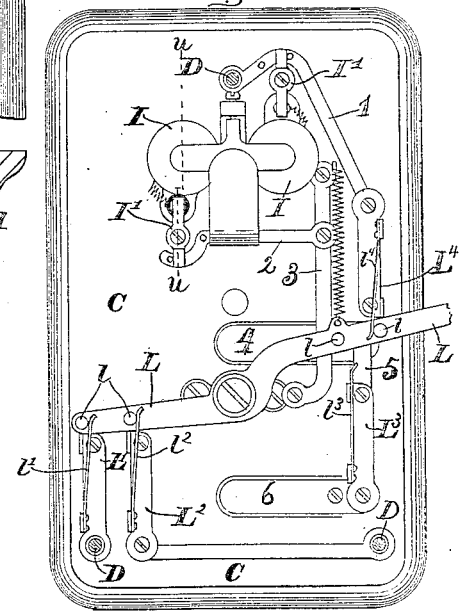
Figure 4:
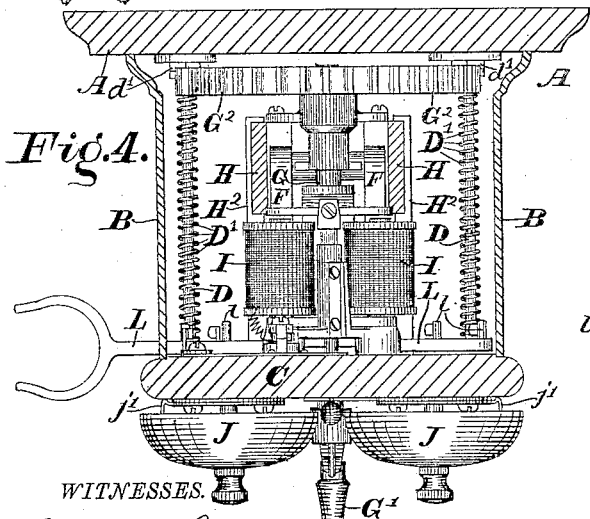
Figure 12:
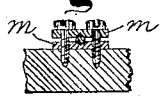

Referring to the accompanying drawings, which are made a part hereof, and on which similar letters of reference indicate similar parts, Figure 1 is a front elevation of a bell-box containing apparatus embodying my improvements; Fig. 2, a rear elevation of the apparatus proper and the cover to the box, said cover and apparatus having been removed from the remainder of the box; Fig. 3, a view similar to Fig. 2, except that the gearing, generator, and permanent or horseshoe magnets are removed; Fig. 4, a top plan of the apparatus as seen when looking downwardly from the dotted line $z$ $z$, except the magnets, which are shown as if the view was a section on the line of the driving-shaft; Fig. 5, a horizontal section, looking downwardly from the dotted line $y$ $y$; Fig. 6, a central vertical section, looking to the left from the dotted line $x$ $x$ in Fig. 1, and to the right from said dotted line in Fig. 2; Fig. 7, an elevation of the apparatus as seen when looking toward the center from the dotted lines $w$ $w$ in Figs. 1 and 2; Fig. 8, a vertical section, looking to the rear from the dotted line $v$ $v$; Fig. 9, a detail section on the dotted line $u$ $u$ in Fig. 3; Fig. 10, a detail plan view of the base-plate on which one of the bells is mounted, and the devices by which the positions of said base-plate and bell are shifted; Fig. 11, a detail section on the dotted line $t$ $t$ in Figs. 1, 6, and 10; and Fig. 12, a detail sectional view on the dotted line $s$ $s$ in Fig. 1.

In said drawings, the portions marked A represent the board upon which the box is mounted; B, the sides of the box; C, the cover thereto; D, screws or bolts for holding the cover in place, and which may serve, also, as electrical connections; E, the rotary armature of the magneto-electric generator; F, the cylinder surrounding the armature; G, the shaft for driving the armature; H, the permanent or horseshoe magnets; I, the electro-magnets, which actuate the bell-hammer; J, the bells; K, a screw for adjusting the armature to said magnets; L, the gravity-switch, and M the telephone.

The board A is the usual board, upon which the telephonic apparatus now most generally in use is usually mounted, and carries the usual binding-posts, wires, and other connections, &c. As this present invention relates only to the call-signal apparatus the lower part of this board, carrying the transmitter and battery-box, is not shown.

The box B is preferably made of cast-iron and cast in one piece, as shown, as a matter of economy of manufacture. It is secured to the board A by screws $b$, as shown, or in any other suitable manner.

The cover C takes the place of the hinged door heretofore used on said boxes. Instead of the usual hinges, however, I use the screws or bolts D to hold this cover in place. A distinguishing feature of my present invention is that the magneto-generator, as well as all or nearly all the other portions of the apparatus are secured to this cover, instead of to the back or bottom of the box, as has been common. The electrical connections being principally made by means of contact-springs or the screws that hold the cover onto the box, the cover and all the apparatus can be removed by simply unscrewing said screws, and, when removed, it is accessible from several sides instead of one only, as in previous constructions of apparatus. By this means the whole apparatus is rendered much more accessible for purposes of adjustment or repair, and is therefore more convenient and desirable. The annoyance that sometimes arises from uncertain electrical connections through the hinges is also avoided.

The screws D are used to connect the cover

C to the back board, A. They also form electrical connections from the lines and other wires running along or attached to said back board to the apparatus mounted on said cover. Spiral springs D' surround these screws, the object of which is twofold. They hold said screws securely in place, preventing them from falling out when the cover is removed, and insure a perfect electrical connection between said screw and the strip through or alongside which it passes. Nuts d' are placed upon these screws and form the bearings on which the springs rest. Two nuts are ordinarily used on each screw, the second ones for the ordinary purposes of lock-nuts.

The armature E is similar in general form to many other armatures. It is, however, constructed in a peculiar manner; but this construction, being the subject of another intended application for Letters Patent, will not be further described herein.

The cylinder F is composed of two magnetic pole-pieces connected together by non-magnetic portions F' and F². The upper non-magnetic portion, F', extends upward and forms bearing-supports for the shaft G, as shown most plainly in Fig. 6.

The shaft G is the main driving-shaft of the apparatus, and extends from the front of the box, where it bears a crank, G', to near the rear, where it bears the friction, belt, or gear wheel G², which engages with a corresponding wheel, E², on the armature-shaft, and thus drives the armature. There is in connection with this shaft an automatic shunt, or a device whereby the generator will be shunted out at all times except when the call-signal mechanism is put in operation. Said shaft is secured to the hub of the wheel G² by a pin, $g$, which passes through said shaft and rests in a V-shaped notch in the end of said hub, said notch being shown by dotted lines in Fig. 6, and a face-view thereof being given in Fig. 2. At a suitable point upon the shaft G a disk, G³, is mounted, and a spring, $g^3$, is coiled around said shaft, extending from this disk to the journal-bearing next the hub of the wheel G². This spring, except when forcibly compressed, operates to hold the shaft toward the cover C and keep the disk G³ against the insulated pin $f''$, which bears against the contact-spring 4, and thus forms an electrical connection which, when in its normal position, shunts out the generator, as will be hereinafter described. When the crank G' is turned, and the shaft G thus rotated, the first operation is to slide the pin $g$ up the sides of the V-shaped notch, thus drawing the shaft toward the base-board A, and parting the contact between the disk G³ and pin $f''$, which breaks the short circuit and forces the current to go by the longer route through the electro-magnets I of the "ringer." When the turning ceases and the force on the crank G' is removed, the spring $g^3$ operates to force the shaft G back into its normal position, bringing the disk G³ again into contact with the pin $f''$ and re-establishing the shunt or short route past the generator, thus cutting out the resistance of said generator from the main circuit.

The magnets H are similar to other permanent or horseshoe magnets, except that the bow portion is swelled to a greater diameter than the distance between the poles, so that the electro-magnets I and surrounding apparatus may be located centrally in relation thereto, without coming so close as to affect the electrical operation. These magnets are secured to the armature-cylinder by clamps H' and screws $h'$, and are secured in upright position by the stay-pieces H², which are fastened by screws or otherwise to the cover C.

The ringer-magnets I are secured to the cover C by pivoted clamp-bars I' and dowel-pins $i$. The dowel-pins pass through lugs on the frame of these magnets and enter the cover. The clamps are secured to the cover by pivot-screws, and are turned on or off the pins or lugs $i$ at pleasure, thus holding the magnets and their frame securely onto the cover, or permitting the same to be removed therefrom. These clamps are also utilized as a portion of the electrical connections, the magnets being connected to said dowel-pins in the same manner that they are usually connected to binding-screws. One of said pins $i$ is surrounded by insulating material where it passes through the base or frame of the magnets, in order that the currents shall not become short-circuited through said base, instead of passing in the proper course through the coils of the magnets.

The bells J are provided with base-plates J', to which their stems $j$ are secured, as shown most plainly in Fig. 11, and which have cam-slots therein, as shown in Fig. 10. These base-plates are mounted upon the cover C or upon plates C' thereon, to which they are secured by screws $c'$, which pass through the cam-slots therein. These base-plates are each provided with an upturned projection, $j'$, by which they may be partly rotated, any device having a blade or a tang, as a screw-driver, being a suitable tool with which to operate it. Rotating the plates of course changes the position of the bells, and said bells can thus be easily adjusted as desired without removing them from their mountings. As the matter of properly adjusting the bells to suit the requirements of different customers has heretofore been a matter of some difficulty, this improvement is of considerable importance.

The screw K passes through the cover of the box to the outside, where a screw-driver or wrench is used to turn the same, and thus adjust the armature of the ringer-magnets which carries the bell-hammer, and thus regulate the stroke of said hammer. This screw is preferably threaded, both where it passes through the base or frame of said magnets, and also where it passes into the slide or frame upon which the armature is mounted, and the threads are preferably of different pitch, so that the adjustment may be made with a greater degree of nicety than if the means of effecting it were a plain simple screw.

The switch L is the usual gravity-switch, modified somewhat in construction to adapt it to the requirements of my improved apparatus. I have, however, devised a new means of insuring perfect electrical connection between this switch and the various contact-points. At the several points where connection is to be made, I have provided contact-pieces $L'$ $L^2$ $L^3$ $L^4$, against which the switch shall strike firmly, and also in connection therewith the springs $l'$ $l^2$ $l^3$ $l^4$, with which projections or pins $l$ on each switch shall also come in contact, thus providing both the "anvil" and the "sliding" or "spring" connection at each point, and insuring a perfect electrical connection, unless both should fail, which would occur so rarely as to be practically not worth considering.

The telephone M is the ordinary Bell hand-telephone, and is connected to my improved apparatus by a flexible cord, $M'$, as usual. The binding-posts by which this cord is secured to the base-board A are of a peculiar form. Instead of the usual single screw to make the connection, (such as are shown upon the telephone M,) a pair of grooved clamp-plates, $m$, are used, which are operated to clamp the tips on the ends of the cord by means of two screws, (see Figs. 1 and 12,) which gives a bearing for a sufficient distance to insure perfect electrical connection at all times, instead of the limited and unsatisfactory connection given by the usual single screw-point. This form of binding-post cannot work loose, and therefore overcomes a trouble which has been a frequent source of annoyance in the old construction.

The operation of my improved apparatus is much the same as that in common use. The current comes in over the line-wire to one of the binding-posts $a$ on the base-board, thence over a connection (not shown) to the upper screw, D, thence either over the strip 1 and one of the clamp-bars $I'$ to the electro-magnets of the ringer or over said strip and the contact device $L^1$ to the gravity-switch L. As the course of the current over the various wires, strips, and springs, 1 2 3 4 5 6 7 8 9 10 11, and through the telephone, transmitter, generator, ringer, battery, &c., is not substantially different from the usual course of such currents, and as the circuits form no part of this present invention, it is not thought necessary to further describe them, as they will be readily understood by those skilled in the art.

Having thus fully described my said invention, what I claim as new, and desire to secure by Letters Patent, is—

1. The combination, with a call-signal apparatus box and the cover thereto, of screw-rods D, which secure said cover to said box, and also form a part of the electrical connections, substantially as set forth.

2. In a call-signal apparatus for telephonic purposes, in combination with the frame of the magnets which actuate the bell-hammer and the frame on which the armature is mounted, a differential screw passing through both, whereby the relation of one of said frames to the other may be accurately and conveniently adjusted, substantially as set forth.

3. In a call-signal apparatus for telephonic purposes, the combination, with the frame of the magnets I and the frame of the armature thereto, of the screw K, which extends from the front of the box containing the apparatus to said frames, whereby the relation of said frames to each other, and consequently that of the armature to the magnets, can be adjusted from the outside of the box, substantially as set forth.

4. The combination, with the frame of the magnets I, provided with dowel-pins $i$, of the pivoted clamps $I'$, whereby said frame is removably secured to the portion of the box on which it is mounted, substantially as set forth.

5. In a call-signal apparatus for telephonic purposes, the combination, with the bells J, of base-plates $J'$, having cam-slots therein, through which the securing-screws pass, and projections $j'$, by which said base-plates may be partly rotated, substantially as described, and for the purpose specified.

6. The combination, with the gravity or movable switch of a telephone call-signal apparatus, of a device for establishing electrical connections, consisting of a combined anvil and spring contact-piece, substantially as set forth.

7. The combination of the gravity-switch having pins or projections thereon, and devices with which said gravity-switch comes in contact, said devices being provided with springs with which said pins or projections come in contact, substantially as set forth.

In witness whereof I have hereunto set my hand and seal, at Indianapolis, Indiana, this 20th day of January, A. D. 1883.

EZRA T. GILLILAND. [L. S.]

In presence of—
C. BRADFORD,
E. W. BRADFORD.